(12) United States Patent
Lee et al.

(10) Patent No.: US 6,757,042 B2
(45) Date of Patent: Jun. 29, 2004

(54) PLANE SWITCHING MODE LIQUID CRYSTAL DISPLAY DEVICE

(75) Inventors: Yun Bok Lee, Seoul (KR); Jang Jin Yoo, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 272 days.

(21) Appl. No.: 09/938,563

(22) Filed: Aug. 27, 2001

(65) Prior Publication Data

US 2002/0047975 A1 Apr. 25, 2002

(30) Foreign Application Priority Data

Aug. 29, 2000 (KR) ........................................ 2000-50430

(51) Int. Cl.$^7$ ............................................ G02F 1/1343
(52) U.S. Cl. .................... 349/142; 349/139; 349/141
(58) Field of Search ................................ 349/139, 141, 349/142

(56) References Cited

U.S. PATENT DOCUMENTS

| | | | |
|---|---|---|---|
| 5,598,285 A | 1/1997 | Kondo et al. | 349/39 |
| 5,745,207 A | 4/1998 | Asada et al. | 349/141 |
| 5,905,556 A | 5/1999 | Suzuki et al. | 349/141 |
| 5,946,066 A | 8/1999 | Lee et al. | 349/141 |
| 6,266,116 B1 | 7/2001 | Ohta et al. | 349/141 |
| 6,452,657 B1 * | 9/2002 | Suzuki et al. | 349/141 |
| 6,459,465 B1 * | 10/2002 | Lee | 349/141 |
| 6,525,797 B2 * | 2/2003 | Tsuda et al. | 349/139 |
| 6,525,798 B1 * | 2/2003 | Yamakita et al. | 349/141 |
| 6,583,837 B1 * | 6/2003 | Fukumoto et al. | 349/129 |
| 6,618,109 B2 * | 9/2003 | Hidehira et al. | 349/141 |
| 2002/0159016 A1 * | 10/2002 | Nishida et al. | 349/141 |

OTHER PUBLICATIONS

R. Kieler et al.; "In–Plane Switching of Nematic Liquid Crystals"; Japan Display '92; pp. 547–550.
M. Oh–e, et al.; "Principles and Characteristics of Electro–Optical Behaviour with In–Plane Switching Mode"; Asia Display '95; pp. 577–580.
M. Ohta et al.; "Development of Super–TFT–LCDs with In–Plane Switching Display Mode"; Asia Display '95; pp. 707–710.
S. Matsumoto et al.; Display Characteristics of In–Plane Switching (IPS) LCDs and a Wide–Viewing–Angle 14.5–in. OPS TFT–LCD; Euro Display '96; pp. 445–448.
H. Wakemoto et al.; "An Advanced In–Plane Switching Mode TFT–LCD"; SID 97 Digest; pp. 929–932.
S.H. Lee et al.; High–Transmittance, Wide–Viewing–Angle Nematic Liquid Crystal Display Controlled by Fringe–Field Switching; Asia Display '98; pp. 371–374.

* cited by examiner

Primary Examiner—Tom Thomas
Assistant Examiner—N. Drew Richards
(74) Attorney, Agent, or Firm—McKenna Long & Aldridge LLP

(57) ABSTRACT

An in-plane switching mode LCD device is disclosed, in which high response time is obtained and residual images are prevented from occurring. The in-plane switching mode LCD device includes first and second substrates, common electrodes arranged on one of the two substrates in a substantially zigzag pattern, a pixel electrode arranged with a substantially zigzag pattern corresponding to the common electrodes roughly in parallel with the common electrodes, common electrode frames projected from a bent portion of the common electrodes, pixel electrode frames projected from a bent portion of the pixel electrodes, and a liquid crystal between the first and second substrates.

8 Claims, 9 Drawing Sheets direction of electric field

PLANE SWITCHING MODE LIQUID CRYSTAL DISPLAY DEVICE

This application claims the benefit of Korean Patent Application No. 2000-50430 filed on Aug. 29, 2000, which is hereby incorporated by reference as if fully set forth herein.

BACKGROUND OF THE INVENTION

1. Field of the Invention

The present invention relates to a liquid crystal display (LCD) device, and more particularly, to an in-plane switching mode LCD device that has a substantially zigzag pattern electrode structure in which high response time is obtained and residual images are prevented from occurring.

2. Discussion of the Related Art

Recently, research into in-plane switching mode LCD devices is being performed to solve the problems of a twisted nematic (TN) mode LCD device having a narrow viewing angle.

Furthermore, research for improving viewing angle and color shift characteristics is being performed by forming an electrode of the in-plane switching mode LCD in a substantially zigzag pattern.

A related art in-plane switching mode LCD device will be described with reference to the accompanying drawings.

FIG. 1 shows a layout of the related art in-plane switching mode LCD device. FIG. 2 shows an enlarged view of a disclination region in the related art. FIG. 3 shows an enlarged view of a region where electric field is uneven in the related art.

The related art in-plane switching mode LCD device includes a gate line 1, a data line 2, a common line 3, a thin film transistor (TFT) 6, a plurality of common electrodes 4, and a pixel electrode 5.

The gate and data lines 1 and 2 are arranged on a substrate to define a pixel region. The common line 3 is formed within the pixel region in parallel with the gate line 1. The TFT 6 is formed in a portion where the gate line 1 crosses the data line 2. The TFT 6 has a gate electrode (not shown) connected with the gate line 1 and a source electrode connected with the data line 2. The common electrodes 4 are arranged within the pixel region in a zigzag pattern in parallel with the data line 2. The pixel electrode 5 is formed between the common electrodes 4 in a zigzag pattern within the pixel region. Also, the pixel electrode 5 is connected with a drain electrode of the TFT 6 and overlaps the common line 3.

In the related art in-plane switching mode LCD device, if a voltage is applied from an external driving circuit, an electric field parallel to the substrate occurs between the pixel electrode 5 and the common electrode 4, so that liquid crystal molecules are rotated along the electric field, thereby displaying a picture image.

The related art in-plane switching mode LCD device having a zigzag pattern electrode structure has the following characteristics due to its electrode structure.

FIG. 2 is an enlarged view of a portion "K" of FIG. 1. In this portion "K", disclination occurs in which the liquid crystal molecules do not rotate. This is because the electrode structure has a zigzag pattern. As a result, dynamic residual images occur and response time increases.

In portions "A" and "B" of FIG. 2, the liquid crystal 7 moves depending on a pretwist angle and a direction of electric field. However, in a portion "C", where the pixel electrode 5 and the common electrode 4 are bent, the liquid crystal 7 does not move as no pretwist angle exists.

As described above, in case where the electrode structure has a zigzag pattern, the portion of the liquid crystal moves not because of the electric field but in accordance with adjacent liquid crystals.

Particularly, since the liquid crystal 7 in the portions "A" and "B" has a driving direction opposite to that of its adjacent liquid crystal 7 in the portion "C", the liquid crystal in the portion "C" may not be driven.

Furthermore, as shown in FIG. 3, in the in-plane switching mode LCD device having two domains, uneven electric field occurs in a region 8 outside the bend of the common electrode 4 and inside the bend of the pixel electrode 5.

In other words, the electric field generated to be perpendicular to the common electrode 4 and the pixel electrode 5 has an uneven arrangement in the region 8 and thus is not perpendicular to the common electrode 4 and the pixel electrode 5. In such case, response time of the liquid crystal molecules is reduced and dynamic residual images occur.

The related art in-plane switching mode LCD device has several problems.

In case where the electrode has a zigzag pattern to improve viewing angle and color shift characteristics, the liquid crystal may be operated not by the electric field but by adjacent liquid crystal molecules. In this case, the electric field may unevenly be arranged. As a result, the response time becomes slower and the dynamic residual images occur, thereby deteriorating characteristic of the liquid crystal panel.

SUMMARY OF THE INVENTION

Accordingly, the present invention is directed to an in-plane switching mode LCD device that substantially obviates one or more problems due to limitations and disadvantages of the related art.

An object of the present invention is to provide an in-plane switching mode LCD device in which a dielectric frame having a smaller dielectric anisotropy than that of a liquid crystal or an electrode frame is formed in a portion where an electrode is bent, so that the liquid crystal is exactly operated, thereby obtaining high response time and preventing residual images from occurring.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an in-plane switching mode LCD device according to the present invention includes: first and second substrates; common electrodes arranged on one of the first and second substrates in a substantially zigzag pattern wherein each common electrode has at least one bent portion; pixel electrodes arranged with a substantially zigzag pattern corresponding to the common electrodes roughly in parallel with the common electrodes; common electrode frames extending from the bent portion; and a liquid crystal between the first and second substrates.

In another aspect of the present invention, an in-plane switching mode LCD device includes: first and second substrates; common electrodes arranged on one of the first and second substrates in a substantially zigzag pattern; pixel electrodes arranged with a substantially zigzag pattern corresponding to the common electrodes roughly in parallel with the common electrodes wherein each pixel electrode has at least one bent portion; a dielectric frame partially overlapping the bent portion of the pixel electrode and extending from the bent portion, having a gradually decreasing width toward the common electrodes; and a liquid crystal between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
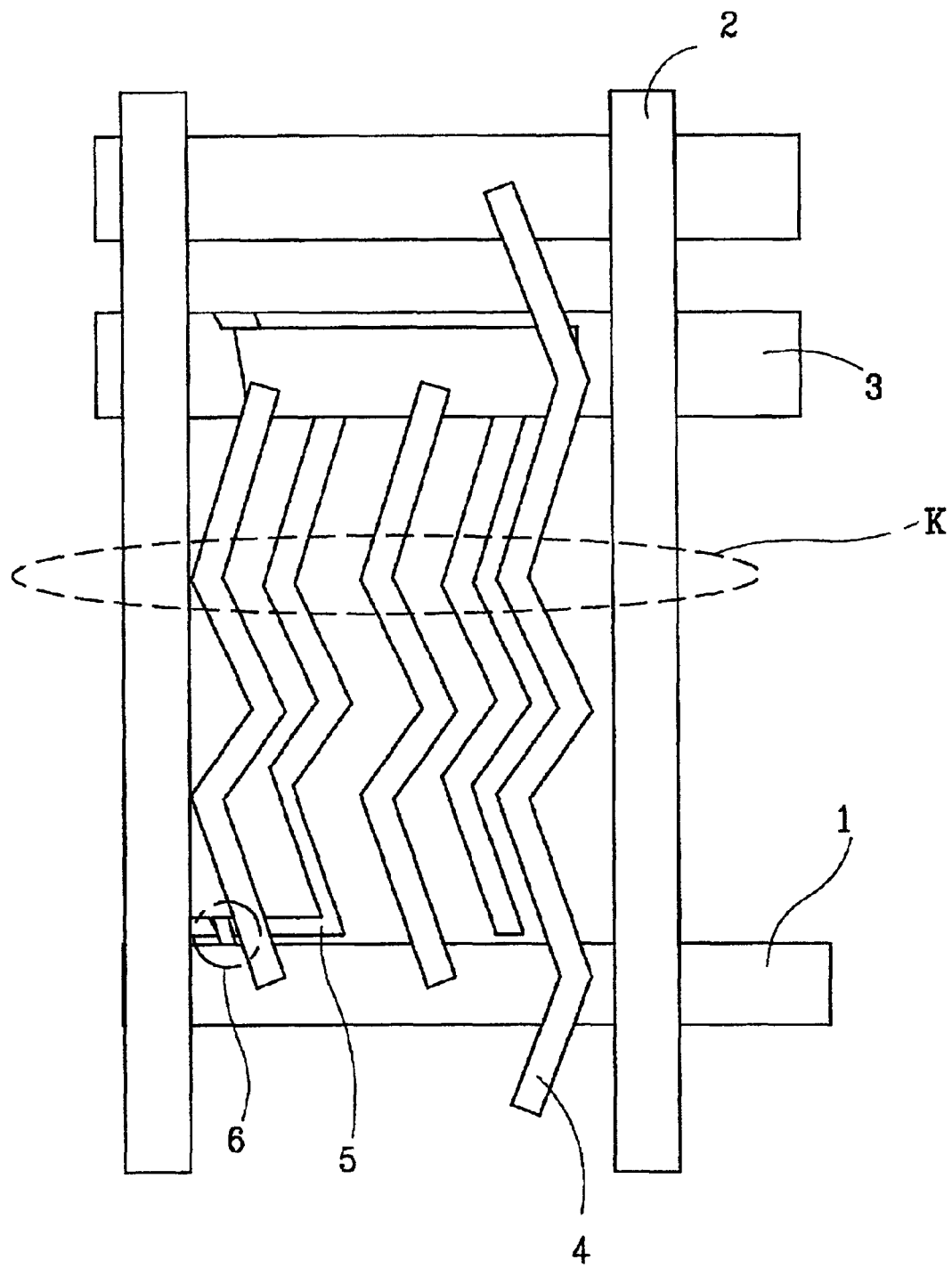
FIG. 1 is a layout illustrating a related art in-plane switching mode LCD device.
Figure 2:
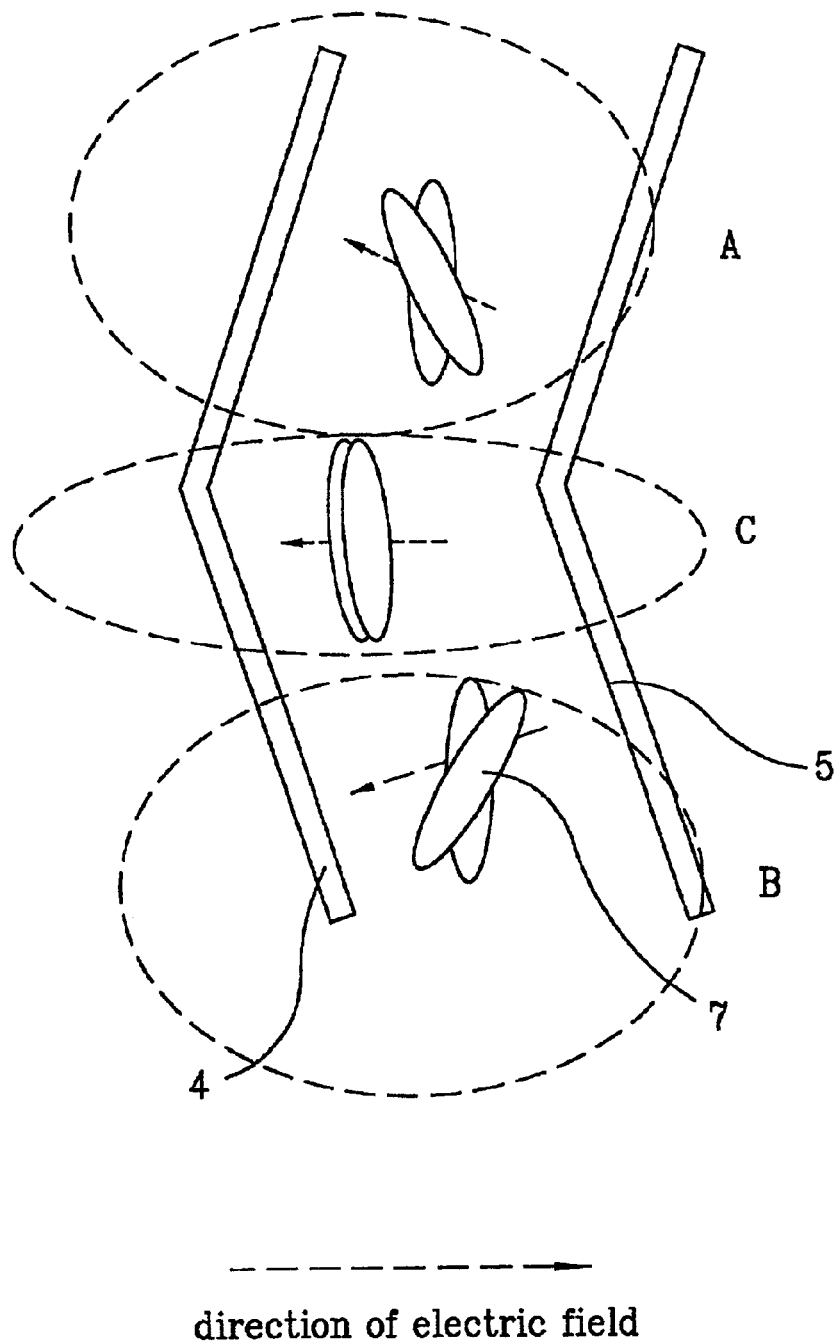
FIG. 2 is an enlarged view of a disclination region in the related art.
Figure 3:
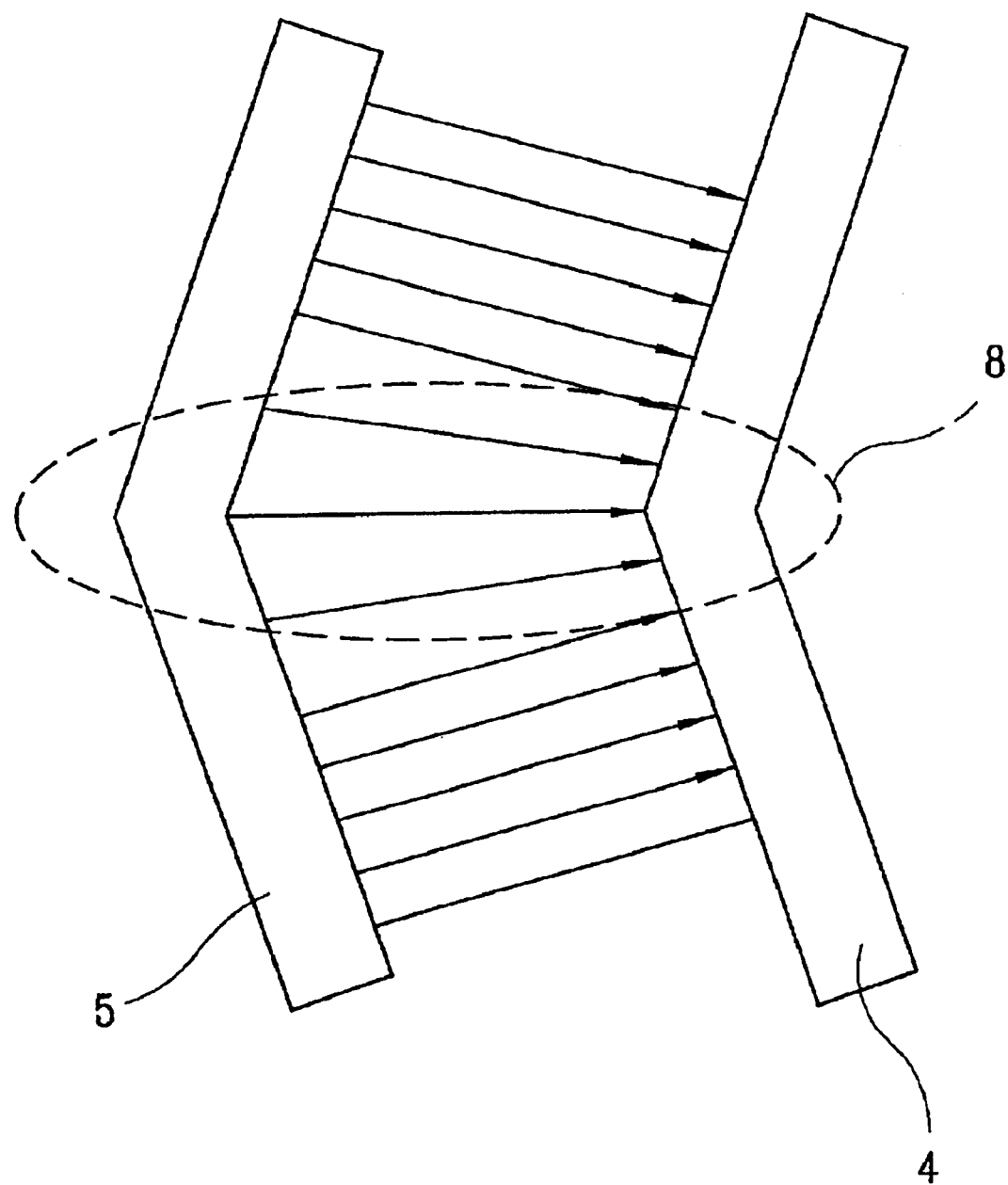
FIG. 3 is an enlarged view of a region where electric field is uneven in the related art.
Figure 4:
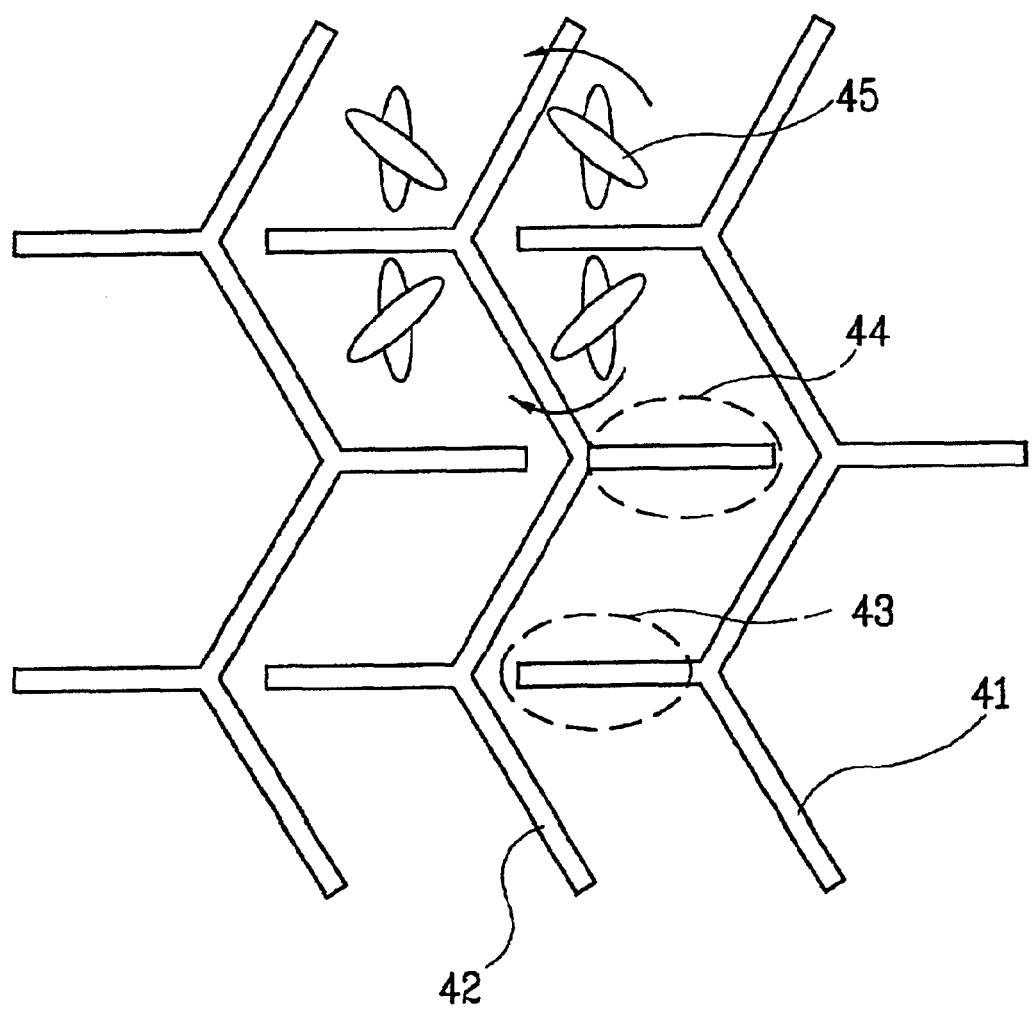
FIG. 4 is a schematic view of an in-plane switching mode LCD device according to a first embodiment of the present invention.

Reference will now be made in detail to the preferred embodiments of the present invention, examples of which are illustrated in the accompanying drawings.

An in-plane switching mode LCD device according to the first embodiment of the present invention includes two substrates (not shown), common electrodes 41 formed on one of the two substrates in a substantially zigzag pattern, a pixel electrode 42 arranged with a substantially zigzag pattern corresponding to the common electrode 41 roughly between the common electrodes 41 in parallel with the common electrode 41, and common electrode frames 43 projected to form at least two domains around a portion where the common electrode is bent, the domains controlling movement of a liquid crystal outside the bent portion of the common electrode. The bent portion of the common electrode is bent at an angle smaller than 180° in a substantially zigzag pattern of the common electrode 41. Pixel electrode frames 44 project to form at least two domains around a portion where the pixel electrode is bent, the domains controlling movement of a liquid crystal outside the bent portion of the pixel electrode. The bent portion of the pixel electrode is bent at an angle smaller than 180° in a substantially zigzag pattern of the pixel electrode 42. There is a liquid crystal 45 between the two substrates.

The common electrode frames 43 are arranged in parallel with one another, and the pixel electrode frames 44 are also arranged in parallel with one another.

The common electrode frames 43 are located between two neighboring pixel electrode frames 44, and the pixel electrode frames 44 are located between neighboring common electrode frames 43. The pixel electrode frames 44 and the common electrode frames 43 are alternately arranged in one direction of a panel.

Each pixel electrode frame 44 and each common electrode frame 43 do not contact a corresponding common electrode 41 and a corresponding pixel electrode 42.

The common electrode frame 43 is essentially located inside the bent portion of the pixel electrode 42, i.e., inside the angle smaller than 180° formed by the bend in the pixel electrode. The pixel electrode frame 44 is essentially located in a bent portion of the common electrode 41, i.e., inside the angle smaller than 180° formed by the bend in the common electrode.

Figure 5:
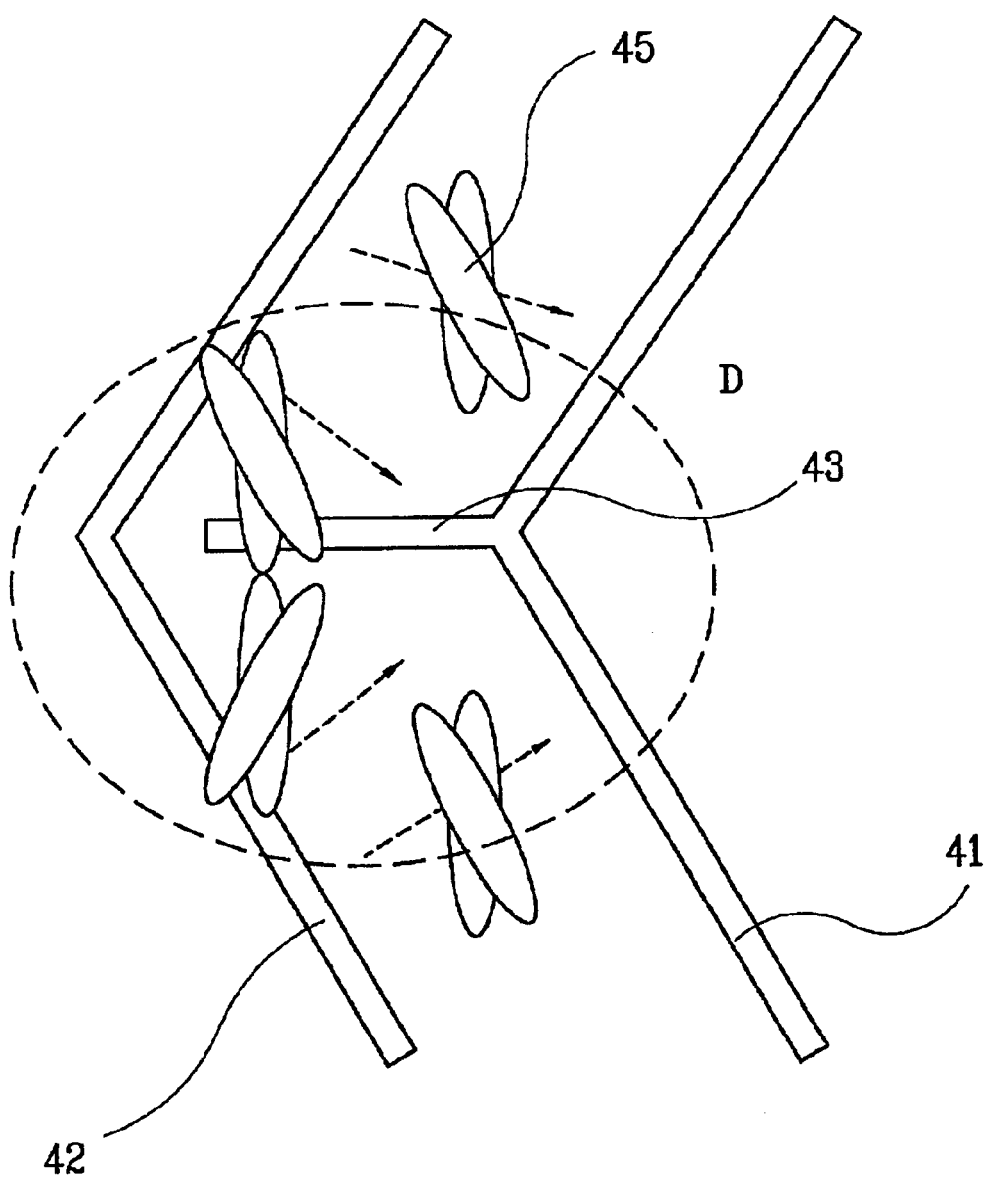
FIG. 5 is a schematic view of an electrode frame region according the first embodiment of the present invention.

In the aforementioned in-plane switching mode LCD device of the present invention, as shown in FIG. 5, the common and pixel electrode frames 43 and 44 form at least two domains in a region where the common electrode 41 and the pixel electrode 42 are bent, i.e., a portion D where the common electrode frame 43 or the pixel electrode frame 44 is formed. The domains serve to drive the liquid crystal 45 by means of the electric field, so that the operation range of the liquid crystal is driven not by the electric field, not by neighboring liquid crystal molecules.

An in-plane switching mode LCD device according to the second embodiment of the present invention will be described with reference to FIGS. 6A and 6B and 7A and 7B.

In the second embodiment of the present invention, the common electrode 41 and the pixel electrode 42 are arranged in a substantially zigzag pattern so as to prevent uneven electric field from occurring in a portion where the electrode is bent.

Figure 6A:
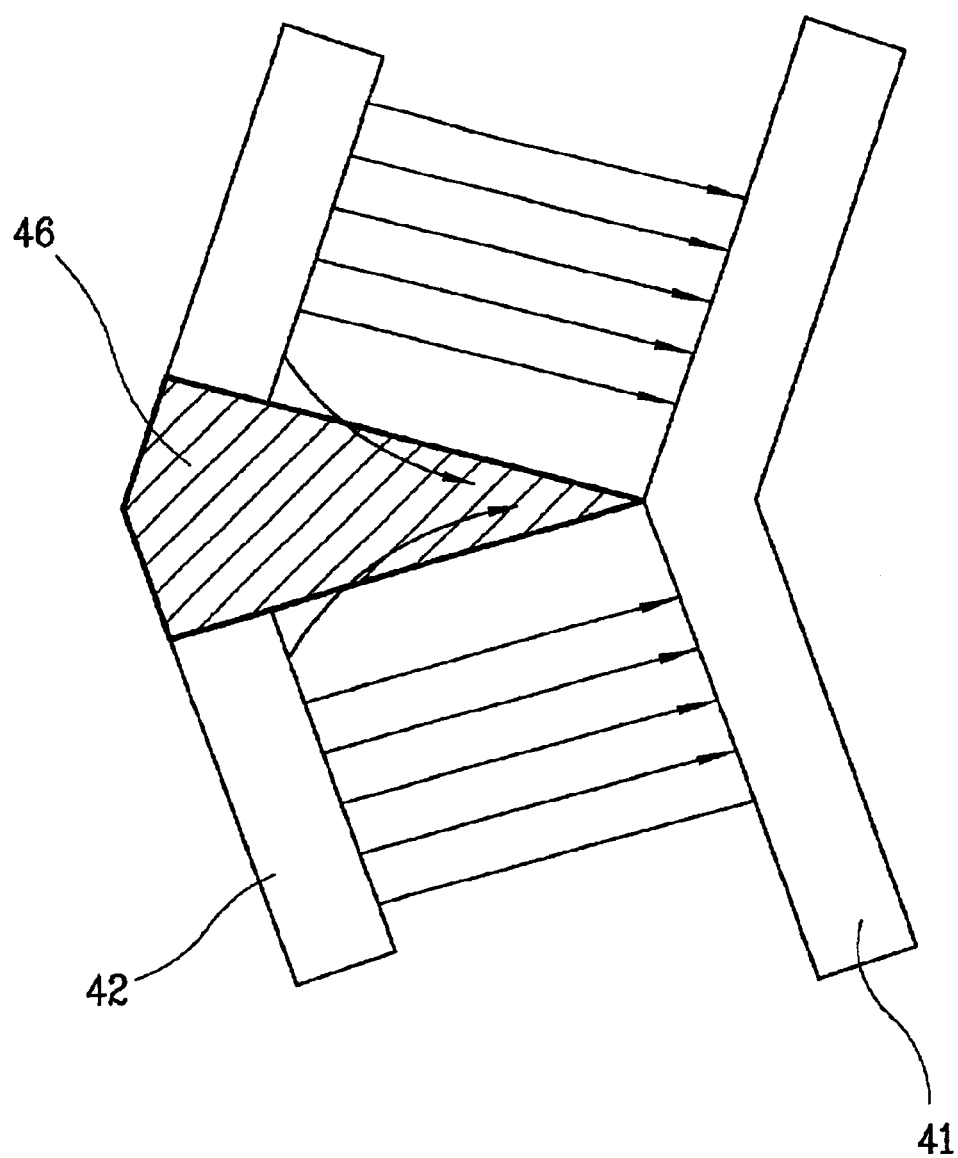
FIGS. 6A and 6B are plan views of a dielectric frame region according to a second embodiment of the present invention.
Figure 6B:
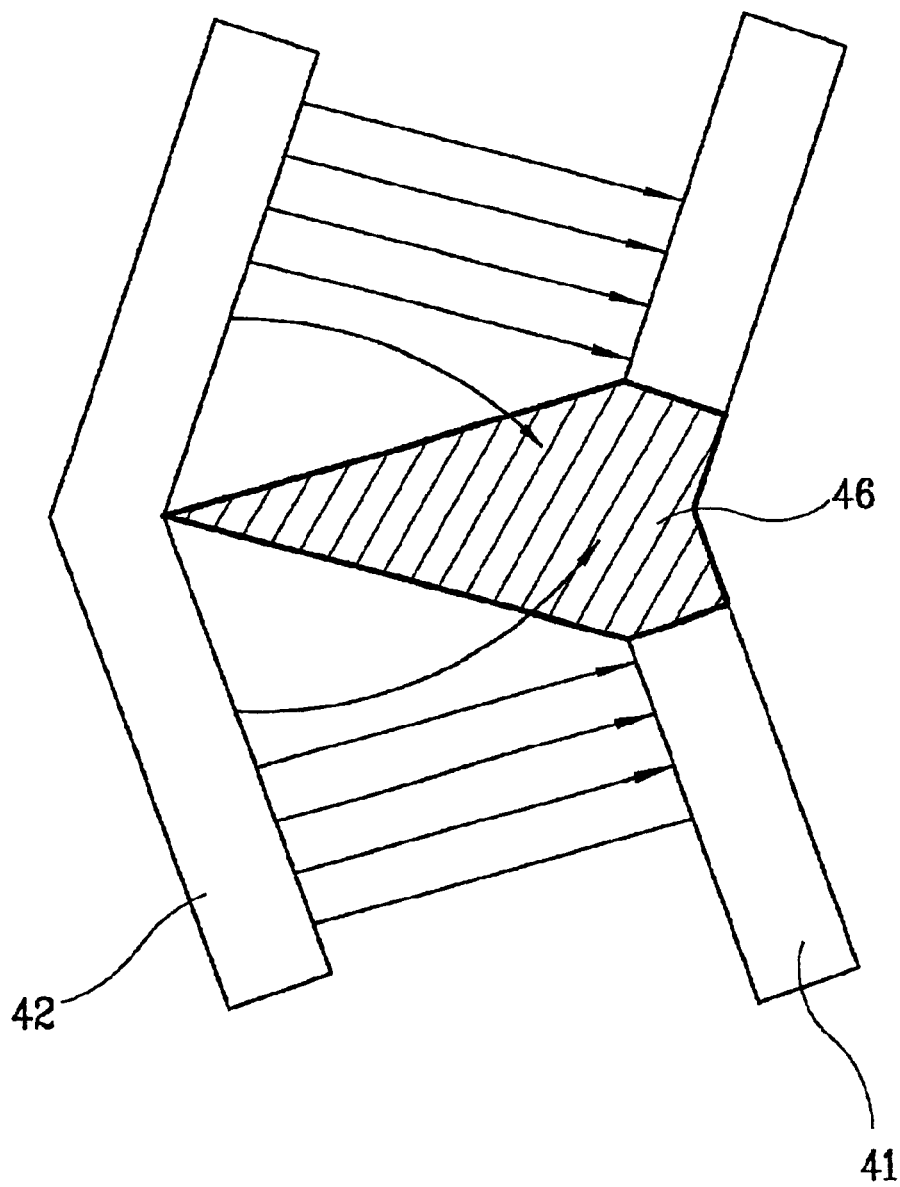

As shown in FIG. 6A, a dielectric frame 46 is formed to partially overlap the pixel electrode 42 and includes a dielectric material having a dielectric anisotropy smaller than that of the liquid crystal. As shown in FIG. 6B, the dielectric frame 46 is formed to partially overlap the common electrode 41 and includes a dielectric material having a dielectric anisotropy greater than that of the liquid crystal.

In other words, in FIG. 6A, the dielectric frame 46 partially overlaps the pixel electrode 42 in a portion where electric field is unevenly generated. The width of the dielectric frame 46 gradually decreases toward the common electrode 41 to form a wedge shape.

In FIG. 6B, the dielectric frame 46 partially overlaps the common electrode 41 in a portion where electric field is unevenly generated. The width of the dielectric frame 46 gradually decreases toward the pixel electrode 42 to form a wedge shape.

The dielectric frame 46 reduces the density of the electric field so that the uneven electric field is minimized during driving of the liquid crystal.

The dielectric frame 46, as shown in FIG. 6A, is formed inside a bent portion of the pixel electrode 42. The bent portion of the pixel electrode 42 is bent at an angle smaller than 180° in a substantially zigzag pattern of the pixel electrode 42. Alternatively, the dielectric frame 46, as shown in FIG. 6B, is formed outside a bent portion of the common electrode. That is, outside the angle smaller than 180° in a substantially zigzag pattern of the common electrode 41.

Figure 7A:
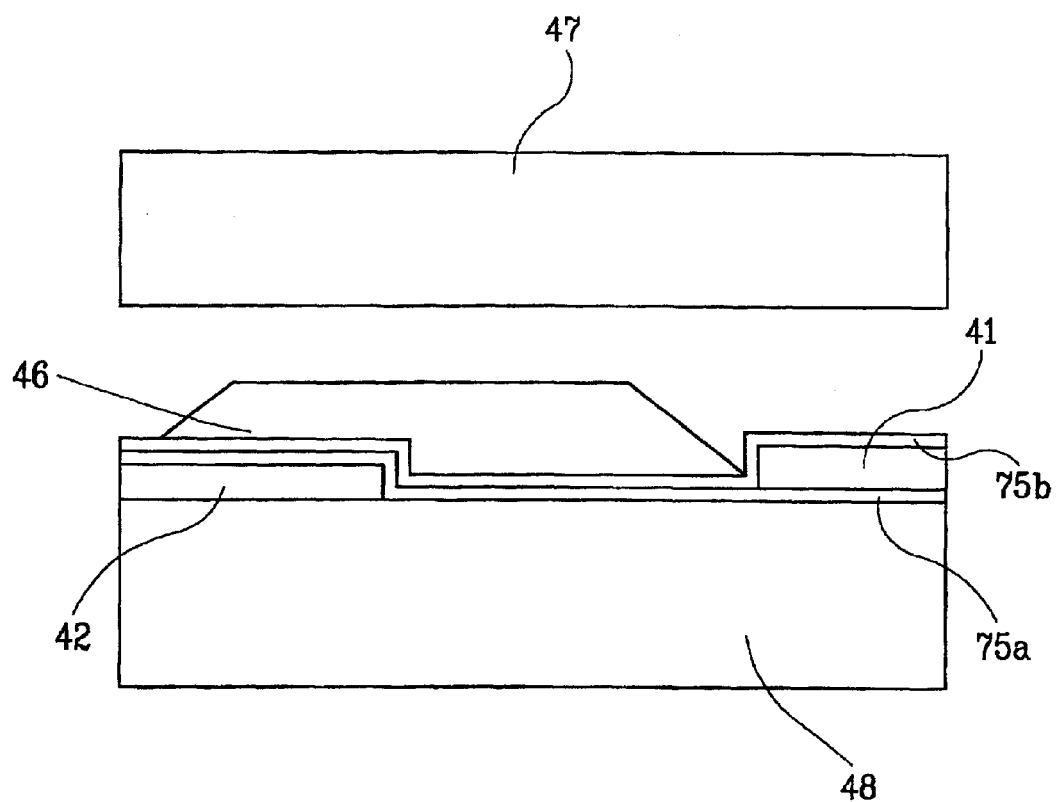
FIGS. 7A and 7B are sectional views of the dielectric frame region according to the second embodiment of the present invention.

The dielectric frame 46, as shown in FIG. 7A, the dielectric frame 46 has a smaller thickness than the distance between a lower substrate 48 and an upper substrate 47.

Figure 7B:
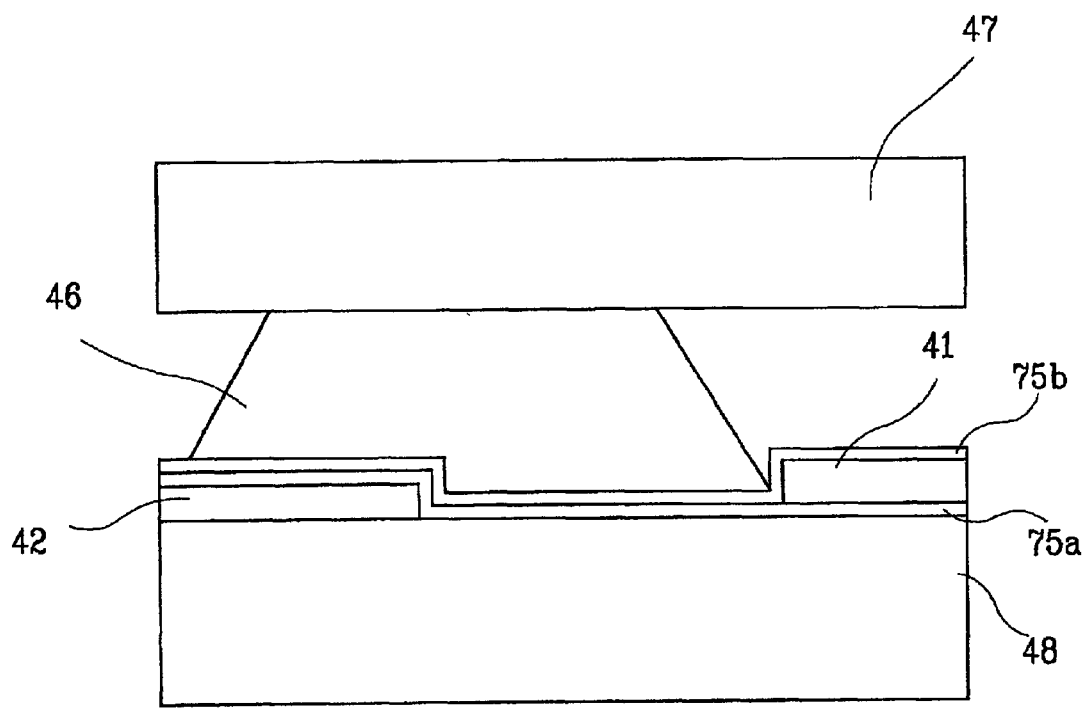

By contrast, as shown in FIG. 7B, the dielectric frame 46 may have the substantially same thickness as the distance between the lower substrate 48 and the upper substrate 47 so that it can serve as a spacer.

As aforementioned, the in-plane switching mode LCD device according to the present invention has the following advantages.

The dielectric frame having a smaller dielectric anisotropy than that of the liquid crystal is formed in a portion where the electric field is unevenly generated as it converges in a bent portion of the electrode. This reduces the density of the electric field so that the uneven electric field is minimized during driving of the liquid crystal. In this case, high response characteristic can be obtained and residual images can be prevented from occurring.

Likewise, the electrode frame is formed in a portion where the operation range of the liquid crystal operated by driving its neighboring liquid crystal not by the electric field exists, so that the liquid crystal can exactly be operated, thereby obtaining high response time and preventing residual images from occurring. Particularly, in case where the electrode frame is formed, it is possible to form at least two domains that move the liquid crystal in a portion where the electrode is bent.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An in-plane switching mode liquid crystal display device comprising:
   first and second substrates;
   common electrodes arranged on one of the first and second substrates in a substantially zigzag pattern wherein each common electrode has at least one bent portion;
   pixel electrodes arranged with a substantially zigzag pattern corresponding to the common electrodes roughly in parallel with the common electrodes;
   common electrode frames extending from the bent portion of at least one of the common electrodes; and
   a liquid crystal between the first and second substrates.

2. The device of claim 1, further comprising:
   pixel electrode frames extending from a bent portion of at least one of the pixel electrodes.

3. The device of claim 2, wherein respective common electrode frames are located between two neighboring pixel electrode frames.

4. The device of claim 2, wherein respective pixel electrode frames are located between neighboring common electrode frames.

5. The device of claim 2, wherein respective common electrode frames and the pixel electrode frames are arranged in parallel, with one another.

6. The device of claim 5, wherein the pixel electrode frames and the common electrode frames are alternately arranged in one direction.

7. The device of claim 1, wherein the common electrode frames are essentially located in the bent portion having a smaller angle than 180°.

8. The device of claim 2, wherein the pixel electrode frames are essentially located in the bent portion having an angle smaller than 180°.

* * * * *